United States Patent [19]

Nasserbakht

[11] Patent Number: 5,658,063
[45] Date of Patent: Aug. 19, 1997

[54] MONITORLESS VIDEO PROJECTION SYSTEM

[75] Inventor: Gitty N. Nasserbakht, Dallas, Tex.

[73] Assignee: Texas Instruments Incorporated, Dallas, Tex.

[21] Appl. No.: 556,783

[22] Filed: Nov. 2, 1995

[51] Int. Cl.$^6$ ............................................... G03B 21/14
[52] U.S. Cl. ............................................................ 353/122
[58] Field of Search ........................... 353/12, 13, 72, 353/119, 122; 345/905, 32; 364/708.1

[56] References Cited

U.S. PATENT DOCUMENTS

| | | | |
|---|---|---|---|
| 5,091,873 | 2/1992 | Araki | 364/708 |
| 5,187,510 | 2/1993 | Vogeley et al. | 353/122 |
| 5,218,389 | 6/1993 | Harlan et al. | 353/122 |
| 5,262,926 | 11/1993 | Hall | 361/681 |
| 5,442,414 | 8/1995 | Janssen et al. | 353/122 |
| 5,461,437 | 10/1995 | Tanaka et al. | 353/71 |
| 5,483,250 | 1/1996 | Herrick | 345/32 |
| 5,510,806 | 4/1996 | Busch | 345/905 |

*Primary Examiner*—William Dowling
*Attorney, Agent, or Firm*—Ronald O. Neerings; James C. Kesterson; Richard L. Donaldson

[57] ABSTRACT

A monitorless video projection device (10) for projecting video images (22) onto a surface (24) which is resident in a portable computer (12), a keyboard (54) or projection display unit (72) of a desktop computer (66), a hand-held television (98) or a wireless communication device (85), comprising a digital light processing system (112) which includes a light source (114) that provides incident light (116) to a semiconductor light switch (124) having a plurality of micromirrors (126) for receiving and reflecting the light, a color filter (120) between the light source (114) and the semiconductor light switch (124) and an imaging lens (20) for projecting the light reflecting off the micromirrors (126) onto an existing surface (24), thereby displaying video image (22).

15 Claims, 7 Drawing Sheets

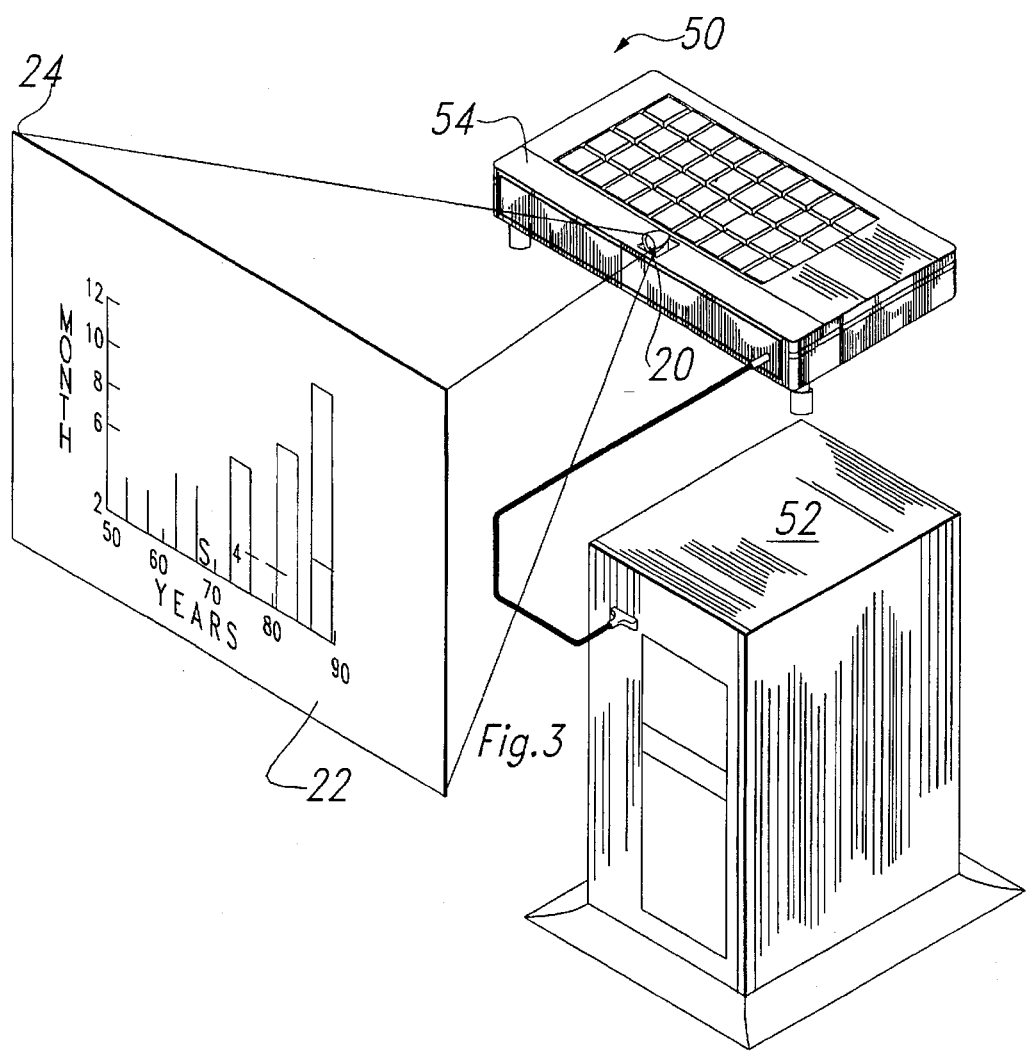
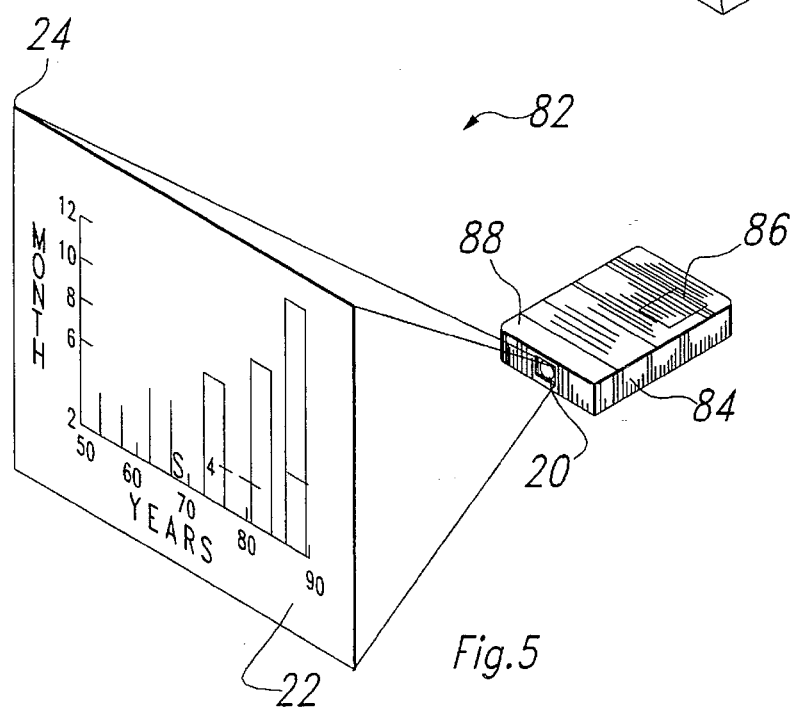

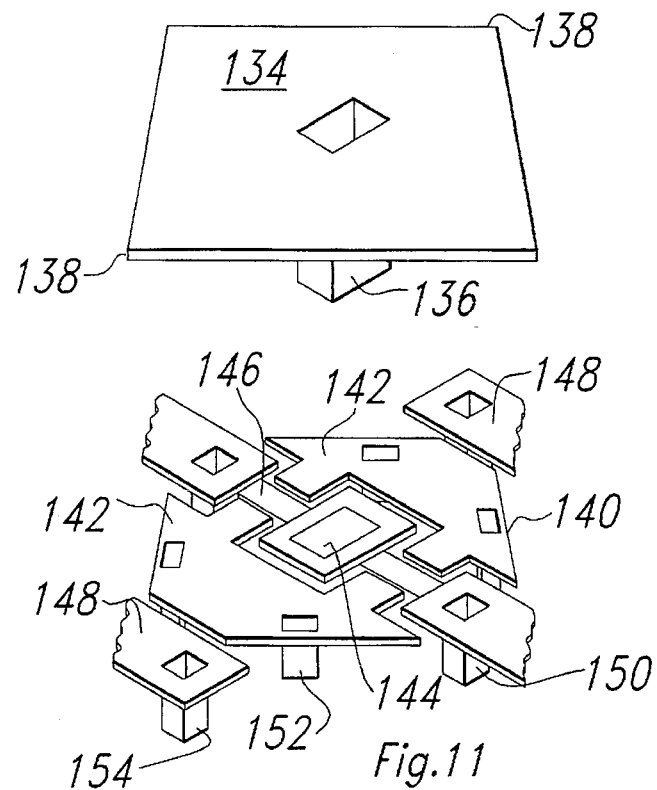
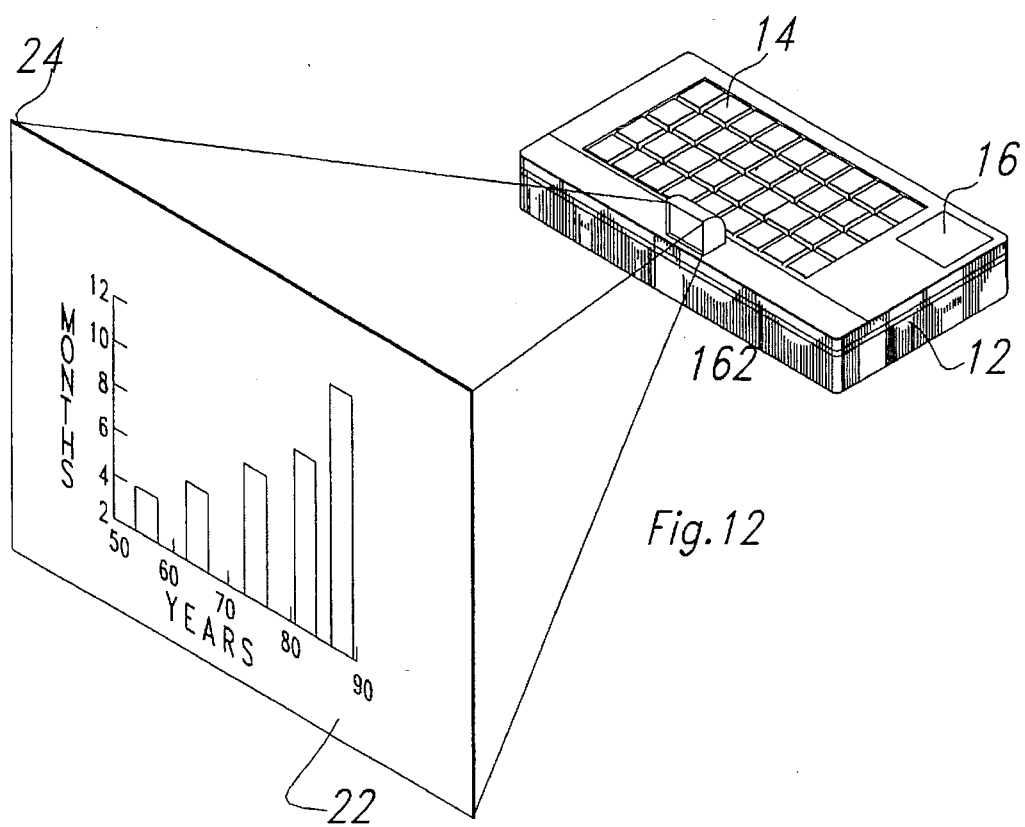
Fig.11
Fig.12

MONITORLESS VIDEO PROJECTION SYSTEM

TECHNICAL FIELD OF THE INVENTION

This invention relates in general to a device for generating video images, and in particular to, a monitorless video projection system for computer and consumer applications which utilizes a digital light processing system.

BACKGROUND OF THE INVENTION

Without limiting the scope of the invention, its background is described in connection with computer monitors, as an example.

Heretofore, in this field, there has been an increased demand for portable computer systems such as laptop, notebook, and recently, subnotebook computers. These portable computers have dramatically increased the mobility of computing power for the computer user. Since the first portable computer, manufacturers have increased computer mobility by decreasing the size and weight of portable computers. In addition, battery life has been substantially increased.

The monitors presently used with portable computers contribute greatly to the overall size and weight of the computer. Whether the monitor is monochrome display, dual-scan color display, or active matrix color display, the monitor must be of a sufficient size to provide the user with readable images. In addition, the monitor places a great burden on the available system power resources. In some portable applications, the monitor may use as much as 40 percent of the available system power resources.

Portable computers generally require the user to flip up the monitor in order to use the computer. This procedure has proven to be inconvenient or impossible during some portable computer applications such as airline travel.

Many desktop computer users have a monitor located on desks which may not have been originally designed for supporting a monitor. These desktop computer monitors typically require a substantial portion of the desktop computer user's desk space. In addition, while these monitors provide screens that are typically larger than the screens of portable computers, desktop computer users commonly complain of eye strain associated with the use of these monitors.

Presently, both portable computer monitors and desktop computer monitors utilize an analog display, typically cathode ray tubes (CRT) or liquid crystal display (LCD). These analog displays, however, create a limiting factor on today's high end computer graphics displays. Digital display systems overcome some of the limitations of the analog technology by providing the advantages of digitally generated graphics displays with exceptional visual quality, pure color fidelity, no electromagnetic radiation, high contrast ratio, no warm up time, simpler optics, and higher reliability. In addition, images that are created, processed, distributed, and stored digitally can be displayed in a completely digital form.

SUMMARY OF THE INVENTION

It has been discovered that the use of analog monitors with portable as well as desktop computers has been a problem. What is needed is a system for generating digital video images for computer application that is light weight, small in size, energy efficient and inexpensive to manufacture while providing sharp, completely focused and easy to view images.

The present invention disclosed herein comprises a monitorless video projection device having a projection system for projecting video images onto a surface that is light weight, small in size, energy efficient, and inexpensive to manufacture while providing video images that are sharp, completely focused and easy on the eyes of the user. In one embodiment of the present invention the projection system is built into a portable computer such as a notebook computer or a subnotebook computer. In a second embodiment of the present invention the projection system is built into a keyboard which is in communication with a desktop computer. In another embodiment of the present invention the projection system is part of a projection display unit which is in communication with a desktop computer. In an additional embodiment of the present invention the projection system is built into a hand-held television. In another embodiment of the present invention the projection system is built into a wireless communication device.

In one embodiment of the present invention, the projection system comprises a digital light processing system which includes a light source which provides incident light to a semiconductor light switch having a plurality of mirrors for receiving and reflecting the light, a color filter between the light source and the semiconductor light switch and an imaging lens for projecting the light reflecting off the mirrors onto an existing surface, thereby displaying the video images. The mirrors in the semiconductor light switch are made from reflective aluminum and fabricated on a Static Random Access Memory forming a pixel array. In another embodiment of the present invention, the projection system comprises a thin film screen from which video images are projected through an imaging lens onto an existing surface.

The video images projected by the monitorless video projection device of the present invention may be projected on any available surface including but not limited to a retractable screen integrally connected to the housing of the projection device, the rear surface of a seat in an airplane, a wall, a wall having a screen mounted thereon, or the rear surface of a seat in an automobile.

These and other features of the invention that will be apparent to those skilled in the art from the following detailed description of the invention, taken together with the accompanying drawings.

DESCRIPTION OF THE DRAWINGS

In the drawings:

FIG. 3 is a perspective representation of a desktop computer having the monitorless video projection system incorporated into the keyboard;

FIG. 5 is a perspective representation of the monitorless video projection system incorporated into a subnotebook computer;

FIG. 11 is a schematic drawing of the construction of a semiconductor light switch of FIG. 9;

FIG. 12 is a perspective representation of a notebook computer using an alternate embodiment of the monitorless video projection system of the present invention.

Corresponding numerals and symbols in the different figures refer to corresponding parts unless otherwise indicated.

DETAILED DESCRIPTION OF THE INVENTION

The monitorless video projection system of the present invention comprises a housing having a projection system for projecting video images onto a surface. The projection system is light weight, small in size, energy efficient, and inexpensive to manufacture which projects video images that are sharp, completely focused and easy on the eyes of the user.

Figure 1:
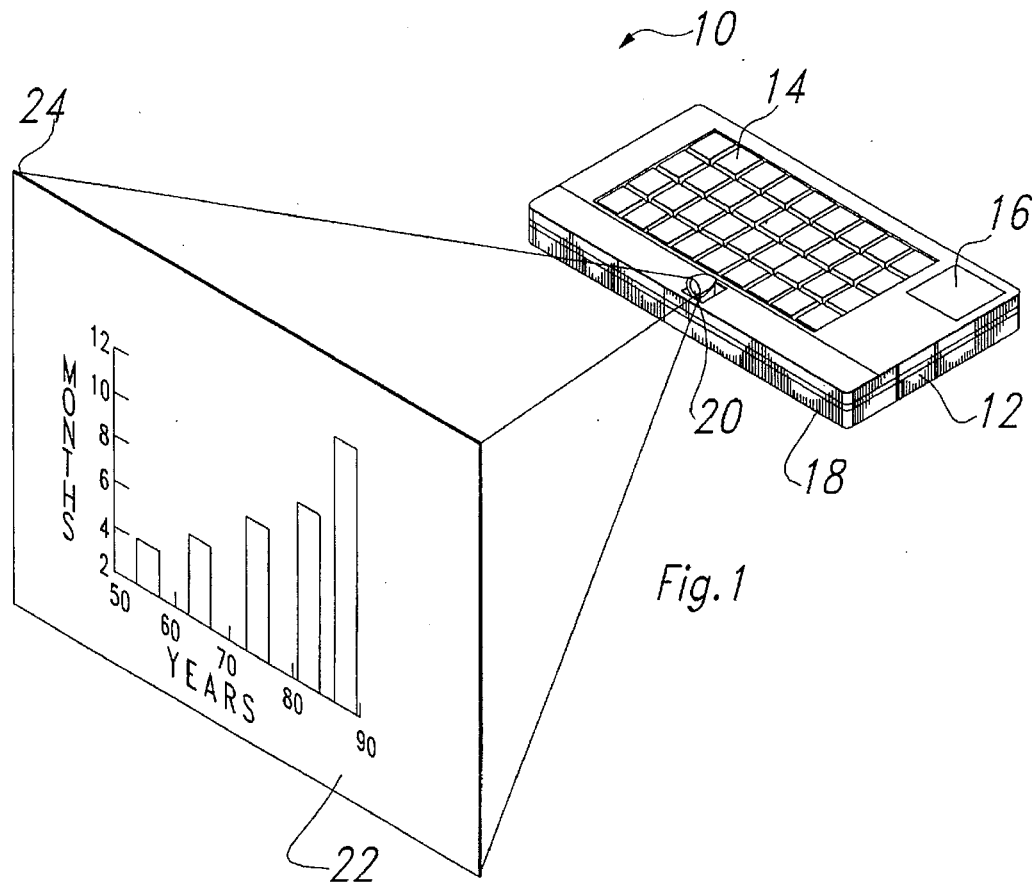
FIG. 1 is a perspective representation of a notebook computer using the monitorless video projection system of the present invention.

In FIG. 1 a monitorless video projection system is generally designated 10. Notebook computer 12 has a keyboard 14 and a pointing device 16. Even though FIG. 1 depicts keyboard 14 and pointing device 16 as input devices, it should be understood that a variety of input devices are equally well suited for the present invention, including but not limited to a mouse, a trackball, or a microphone for voice-activated software such as Voice Assist by Creative Labs or Listen by Vertex.

Housing 18 of notebook computer 12 contains the monitorless video projection system of the present invention as will be discussed in reference to FIGS. 7, 13 and 14 below. Housing 18 of notebook computer 12 has imaging lens 20 which projects video image 22 onto surface 24. Surface 24 may be any available surface including a wall, or a rear surface of a seat on an airplane. The size of video image 22 will depend on the distance between surface 24 and notebook computer 12 as well as the arrangement of lenses within imaging lens 20. Imaging lens 20 may be manually adjustable or include an auto-focus mechanism to assure that video image 22 is sharp and completely focused.

Figure 2:
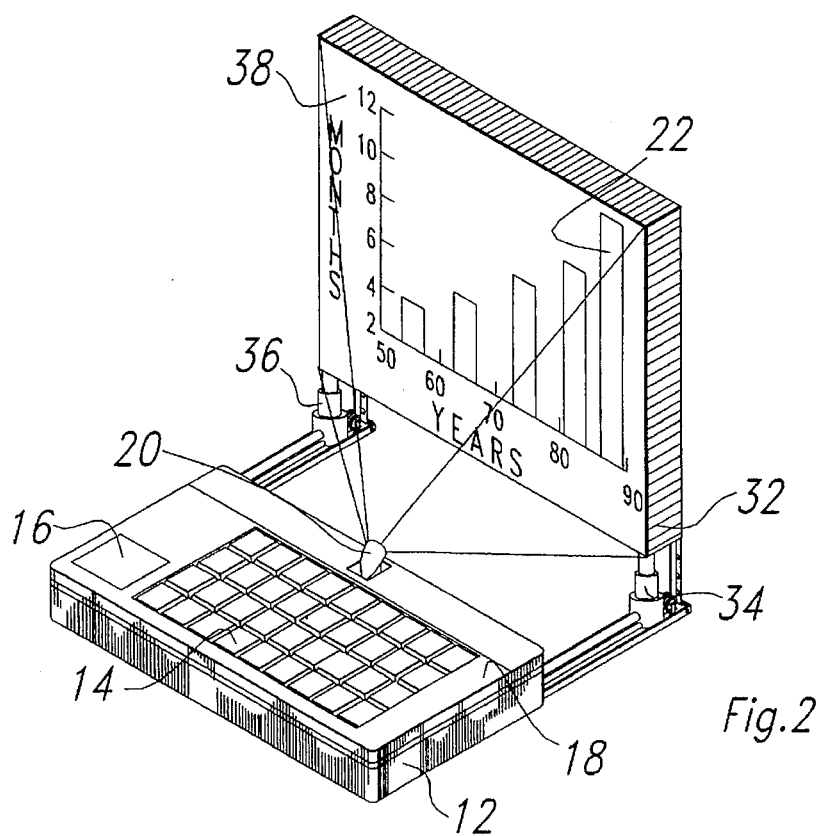
FIG. 2 is a perspective representation of a notebook computer with a retractable screen utilizing the monitorless video projection system of the present invention.

Referring to FIG. 2, notebook computer 12 having keyboard 14, pointing device 16 and retractable screen 32 is depicted. Even though FIG. 2 depicts keyboard 14 and pointing device 16 as input devices, it should be understood that a variety of input devices are equally well suited for the present invention, including but not limited to a mouse, a trackball, or a microphone. Retractable screen 32 comprises telescoping legs 34, 36 and screen 38. Screen 38 may be a single sheet of vinyl, plastic, or other flexible material or screen 38 may be a plurality of slidable slats. When not in use, retractable screen 32 may be stored inside housing 18 of notebook computer 12.

Housing 18 of notebook computer 12 contains the monitorless video projection system of the present invention. Imaging lens 20 projects video image 22 onto screen 38. The exact location of imaging lens 20 is not critical so long as sufficient distance exists between screen 38 and imaging lens 20 to create a suitable sized video image 22. Imaging lens 20 may contain an auto-focus mechanism or may be manually adjustable to assure that video image 22 is sharp and completely focused.

In FIG. 3, desktop computer system 50 is pictured. Desktop computer system 50 comprises central processing unit 52 and keyboard 54 which is linked to central processing unit 52 via cable 56. Keyboard 54 contains the monitorless video projection system of the present invention. Keyboard 54 comprises imaging lens 20 of the monitorless video projection system. imaging lens 20 projects video image 22 onto surface 24. Imaging lens 20 may be manually adjustable or have an auto-focus mechanism which assures that video image 22 is sharp and completely focused. The size of video image 22 is dependant upon the distance between keyboard 54 and surface 24 as well as the lens configuration in imaging lens 20. Surface 24 may be any suitable surface including a wall or a screen mounted on a wall. Keyboard 54 may comprise a retractable screen similar to that described in reference to FIG. 2.

Figure 4:
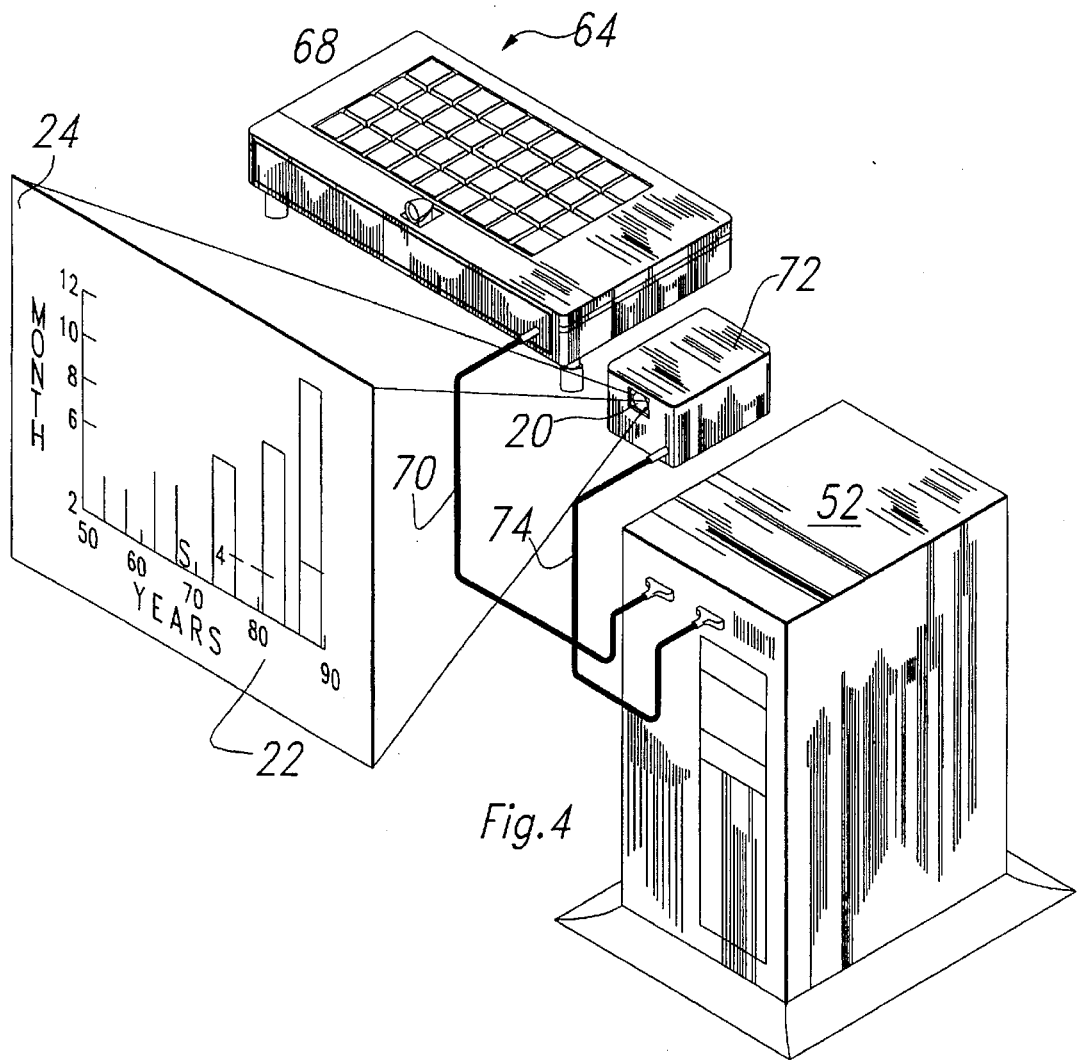
FIG. 4 is a perspective representation of a desktop computer having the monitorless video projection system incorporated into a projection display unit.

Referring to FIG. 4, desktop computer system 64 is depicted. Desktop computer system 64 comprises central processing unit 52 and keyboard 68 which is linked to central processing unit 52 via cable 70. Even though FIG. 4 depicts keyboard 68 as the input device for desktop computer 64, it should be noted that the monitorless video projection system of the present invention is equally well-suited for other input devices such as a pointing device including a mouse or a trackball as well as a microphone for voice-activated software.

Desktop computer 64 also comprises a projection display unit 72 which is linked to central processing unit 52 via cable 74. Projection display unit 72 contains the monitorless video projection system of the present invention, including imaging lens 20. Imaging lens 20 projects video image 22 onto surface 24. It should be noted that the size of video image 22 will depend upon the distance between projection display unit 72 and surface 24 as well as the lens configuration in imaging lens 20. Imaging lens 20 may be manually adjustable or have an auto-focus mechanism to assure that video image 22 is sharp and completely focused. Projection display unit 72 may comprise a retractable screen similar to that described in reference to FIG. 2.

In FIG. 5, subnotebook computer system 82 is pictured. Subnotebook computer 84 has an input device 86. Input device 86 may be any suitable input device including but not limited to a pointing device, a mouse, a trackball or a microphone for voice-activated software. The monitorless video projection system of the present invention is housed within housing 88 of subnotebook computer 84 including imaging lens 20. Imaging lens 20 projects video image 22 onto surface 24. Imaging lens 20 may be manually adjustable or have an auto-focus mechanism which assures that video image 22 is sharp and completely focused. Subnotebook computer 84 may comprise a retractable screen similar to that described in reference to FIG. 2.

Figure 6:
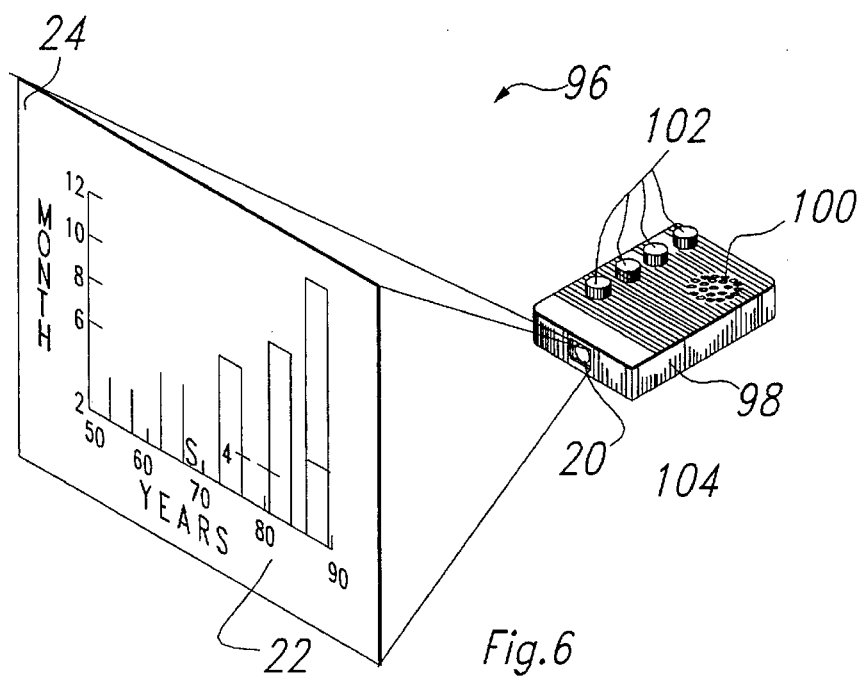
FIG. 6 is a perspective representation of the monitorless video projection system incorporated into a hand-held television.

Hand-held television system 96 is depicted in FIG. 6. Hand-held television 98 comprises speaker 100 and control knobs 102 such as volume and channel control. Even though FIG. 6 depicts speaker 100 as a sound generating device, it should be understood that a variety of sound generating devices are equally well suited for the present invention, including but not limited to headphones.

The monitorless video projection system of the present invention is contained within housing 104 of hand-held television 98. Imaging lens 20 of the monitorless video projection system projects video image 22 onto surface 24. Imaging lens 20 may have an auto-focus mechanism or be manually adjustable to assure that video image 22 is sharp and completely focused. The size of video image 22 is dependant upon the distance between hand-held television 98 and surface 24, as well as the lens configuration in imaging lens 20. Hand-held television 98 may comprise a retractable screen similar to that described in reference to FIG. 2.

Figure 7:
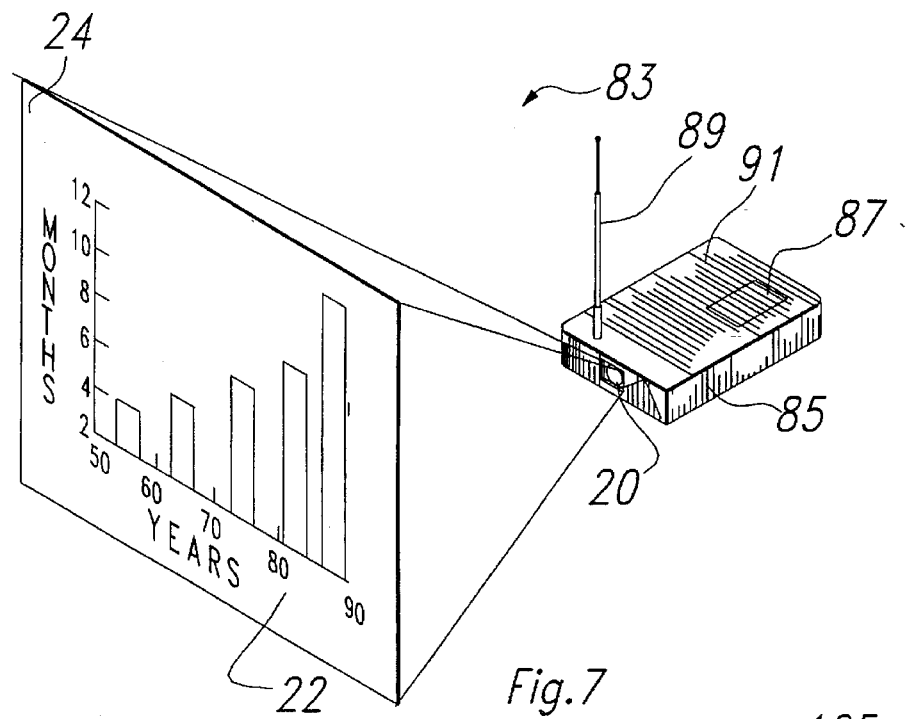
FIG. 7 is a perspective representation of the monitorless video projection system incorporated into a wireless communication device.

Wireless communication system 83 is depicted in FIG. 7. Wireless communicator 85 comprises input device 87 and antenna 89. It should be noted that input device 87 may be any one of a variety of input devices each of which are equally well suited for the present invention, including but not limited to a trackball, a pointing device, or a microphone. Also, it should be understood that a variety of wireless communication devices are equally well suited for the present invention including but not limited to a hand-held video phone or a video messaging system. While FIG. 7 depicts wireless communicator 85 having antenna 89 extending from housing 91, it should be understood that a variety of signal receiving devices are equally well suited for the present invention including but not limited to an internal antenna.

The monitorless video projection system of the present invention is contained within housing 91 of wireless communicator 85. Imaging lens 20 of the monitorless video projection system projects video image 22 onto surface 24. Imaging lens 20 may be manually adjustable or contain an auto-focus mechanism to assure that video image 22 is sharp and completely focused. The size of video image 22 is dependant upon the distance between wireless communicator 85 and surface 24, as well as the lens configuration in imaging lens 20. Wireless communicator 85 may comprise a retractable screen similar to that described in reference to FIG. 2.

Figure 8:
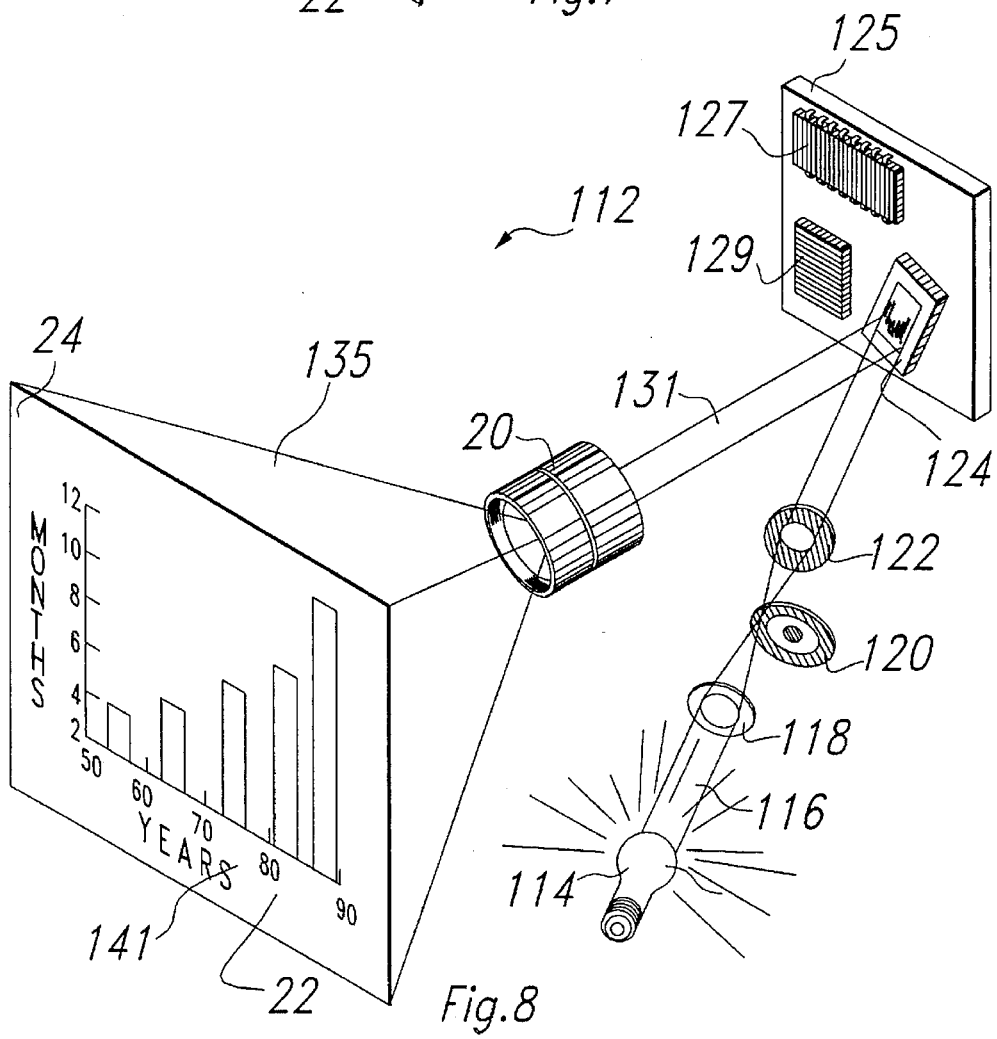
FIG. 8 is a schematic diagram of one embodiment of the monitorless video projection system of the present invention.

FIG. 8 is a schematic diagram of one embodiment of the monitorless video projection system 112 of the present invention which comprises a digital light processing system as described in U.S. Pat. No. 5,192,946 issued on Mar. 9, 1993 which is hereby incorporated by reference. Monitorless video projection system 112 comprises light source 114 which emits incident light 116 through lens 118, color filter 120, and lens 122 which impinges semiconductor light switch 124. Other structures may of course be used to direct a source of concentrated light energy on semiconductor light switch 124 without departing from the invention.

Semiconductor light switch 124 may be a digital micromirror device such as that described in U.S. Pat. No. 5,192,946. Semiconductor light switch 124 is attached to printed circuit board 125. Board 125 also contains digital control 127 and signal processor 129. Incident light 116 reflects off of semiconductor light switch 124 along light path 131 through imaging lens 20. Imaging lens 20 projects light along light path 135 creating video image 22 on surface 24. Light source 114, lens 118, color filter 120, lens 122, and imaging lens 20 are all of a type that is well known in the optical art.

Figure 9:
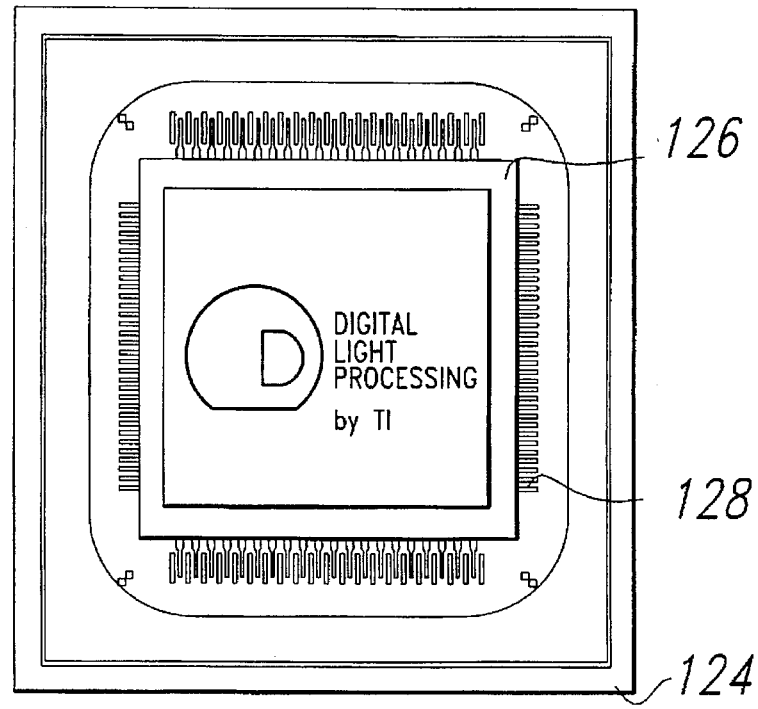
FIG. 9 is a front elevation view of the semiconductor light switch of the monitorless video projection system of the present invention.

Referring to FIG. 9, the semiconductor light switch 124 of FIG. 8 is depicted in an enlarged view. Semiconductor light switch 124 has a surface comprises a plurality of switchable micromirrors 126 that are controllable to redirect light 116 toward imaging lens 20. Semiconductor light switch 124 also has a plurality of signal leads 128 which connect the plurality of micromirrors 126 to static random access memory (SRAM). The plurality of micromirrors 126 form an X-Y array which is typically addressed by a congruent X-Y array of SRAM cells. Gray scale images are achieved through pulse width modulation of the on and off time of each micromirror 126. Color is added by incorporating color filter 120. The most significant bit from the digital intensity for each micromirror 126 is loaded into each corresponding SRAM cell at the beginning of a video frame. All micromirrors 126 remain in the most significant bit state for half of the frame time. The next most significant bit is then loaded and held for one-quarter of a frame time. Each less significant bit is held for a 2× shorter period until all bits are shown.

In an alternate embodiment, semiconductor light switch 124 uses an addressing scheme that takes advantage of a mechanical latching feature of semiconductor light switch 124. If a bias voltage in excess of the address voltage is applied to the plurality of micromirrors 126 after the on or off address voltages are set, the plurality of micromirrors 126 will stay latched in the selected state even if the address voltage changes. Only if the bias voltage is removed and then reapplied will micromirrors 126 settle in the newly addressed state. This feature allows multiple micromirrors 126 to be addressed by a single SRAM cell in quick succession. For example, a semiconductor light switch 124 having an array of 864×576 micromirrors 126 may use a SRAM memory array corresponding to micromirrors 126 consisting of 36 rows of 864 columns. Semiconductor light switch 124 is divided into 16 horizontal sections so that the SRAM memory is loaded and transferred into segments of the array of micromirrors 126 sixteen times to update an entire bit frame displayed by micromirrors 126.

Figure 10:
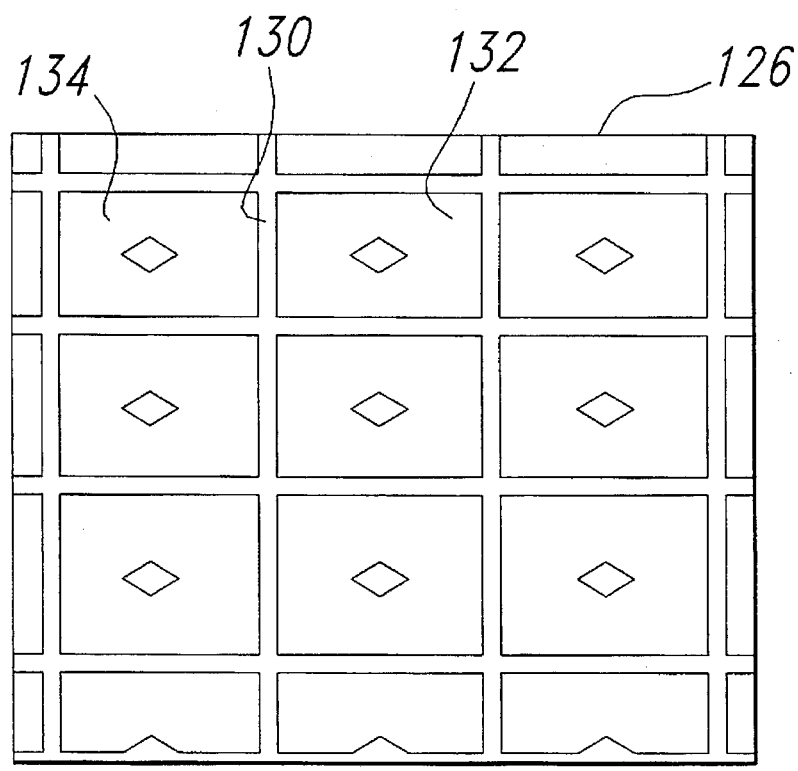
FIG. 10 is an enlarged front elevation of the mirrors on the surface of the semiconductor light switch of FIG. 9.

In FIG. 10, an enlarged view of the plurality of micromirrors 126 of FIG. 9 is depicted. The plurality of micromirrors 126 comprises rectangular mirrors arranged in an X-Y array. A between-mirror gap 130 is present between each mirror; for example, micromirror 132 and micromirror 134. Between-mirror gap 130 is between about 0.8 and 1.2 micrometers. The size of between-mirror gap 130 affects the contrast ratio of video image 22 projected by semiconductor light switch 124, i.e., a smaller between-mirror gap 130 results in improved contrast ratio.

Referring to FIG. 11, a schematic drawing showing the construction of micromirror 134 of FIG. 10 is pictured. Micromirror 134 has a mirror support post 136 and landing tips 138. Micromirror 134 is mounted on base 140. Base 140 comprises address electrodes 142 and tilting yoke 144 having torsional hinge 146. Base 140 is attached to an underlying substrate (not shown) by hinge support post 150, electrode support posts 152 and landing support posts 154.

In operation, as micromirror 134 rotates with torsional hinge 146, landing tips 138 impact landing sites 148. Referring to both FIG. 8 and FIG. 11, when micromirror 134 is in one position, a portion of incident light 116 is redirected along light path 131 through imaging lens 20 where it is enlarged or spread along light path 135 to impinge surface 24 so as to form a pixel 141 of video image 22. When micromirror 134 is in another position, light is not redirected toward imaging lens 20 and hence pixel 141 of video image 22 would be dark. The operation of each of the plurality of switchable micromirrors 126, such as micromirror 134, is controlled by signal processor 129 of printed circuit board 125. Video image 22 is formed by selectively redirecting portion of incident light 116 toward imaging lens 20.

Referring to FIG. 12, an alternate embodiment of the present invention is depicted. Notebook computer 12 has keyboard 14, pointing device 16, and mini-screen 162. Even though FIG. 12 depicts keyboard 14 and pointing device 16 as input devices, it should be understood that a variety of input devices are equally well suited for the present invention, including but not limited to a mouse, a trackball and a microphone. Video image 22 is projected onto surface 24 from mini-screen 162. While FIG. 12 depicts mini-screen 162 as a thin film display, it should be understood that a variety of display mechanisms are equally well suited for the present invention including but not limited to an LCD screen. It should also be noted that mini-screen 162 may be incorporated into keyboard 54 of FIG. 3, projection display unit 72 of FIG. 4, subnotebook computer 84 of FIG. 5, hand-held television 98 of FIG. 6 and wireless communicator 85 of FIG. 7.

Figure 13:
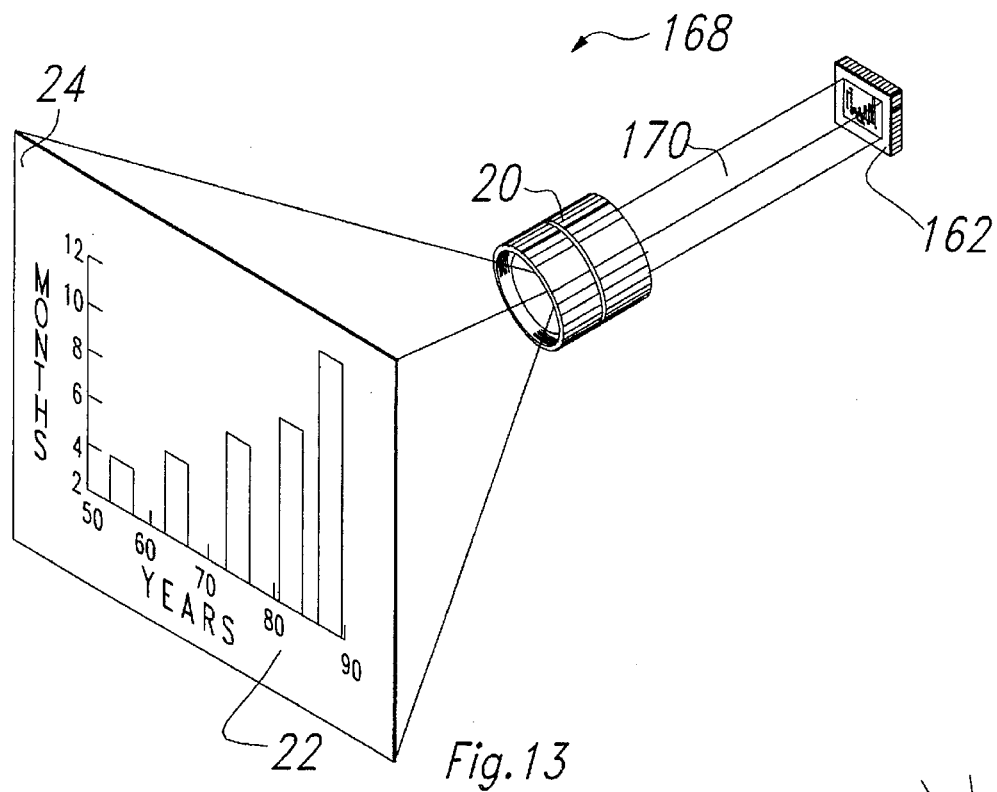
FIG. 13 is a schematic diagram of one embodiment of the monitorless video projection system of the present invention.

FIG. 13 is a schematic diagram of one embodiment of the monitorless video projection system 168 of the present invention. Mini-screen 162 generates lights which travel along light path 170 which enters imaging lens 20. Imaging lens 20 comprises optics that are commonly known in the art. Imaging lens 20 projects video image 22 onto surface 24. Imaging lens 20 may have an auto-focus mechanism or be manually adjustable to assure that video image 22 is sharp and completely focused. The size of video image 22 is dependant upon the distance between imaging lens 20 and surface 24, as well as the lens configuration in imaging lens 20.

Figure 14:
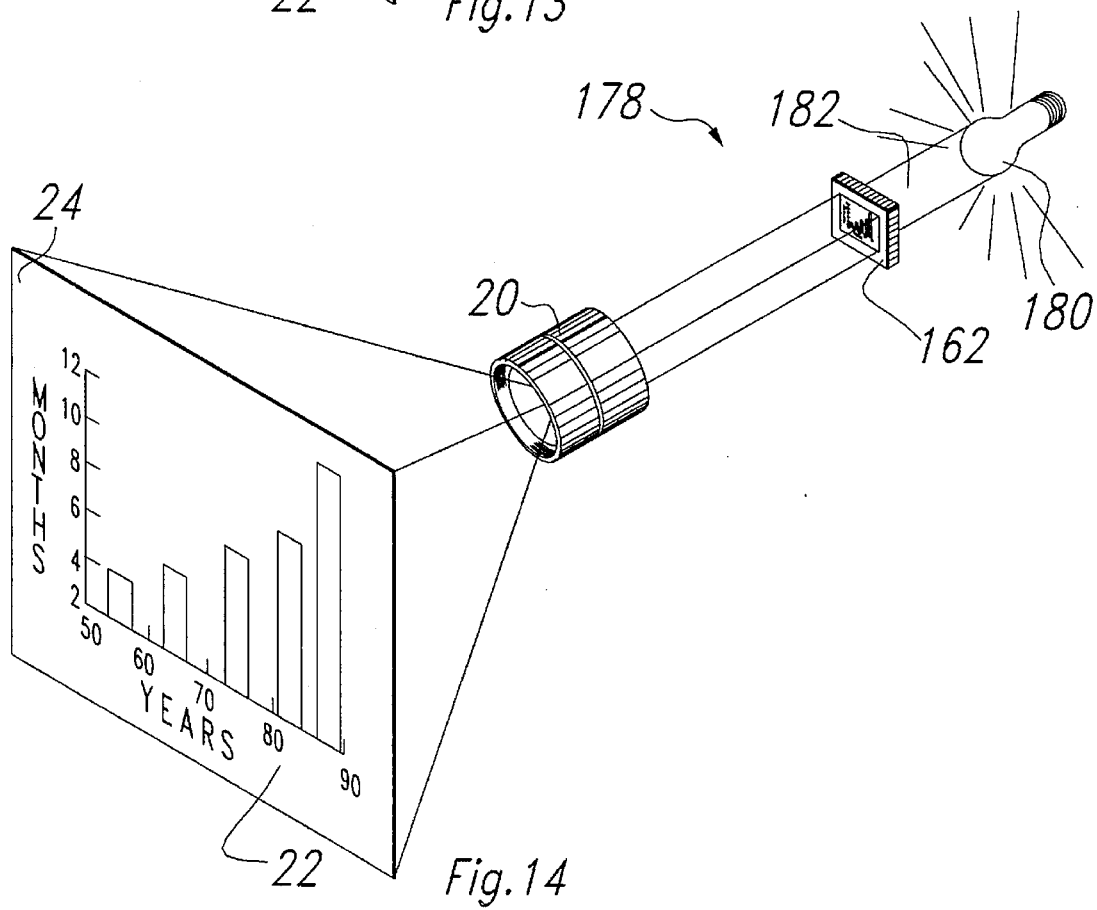
FIG. 14 is a schematic diagram of one embodiment of the monitorless video projection system of the present invention.

FIG. 14 is a schematic diagram of one embodiment of the monitorless video projection system 168 of the present invention. Light source 180 generates light which travel along light path 182 through mini-screen 162. One or more lens (not shown) may be incorporated between light source 180 and mini-screen 162 in light path 182. Other structures may of course be used to direct a source of concentrated light energy through mini-screen 162 without departing from the present invention.

After passing through mini-screen 162, light enters imaging lens 20. Imaging lens 20 comprises optics that are commonly known in the art. Imaging lens 20 projects video image 22 onto surface 24. Imaging lens 20 may be manually adjustable or contain an auto-focus mechanism to assure that video image 22 is sharp and completely focused. The size of video image 22 is dependant upon the distance between imaging lens 20 and surface 24, as well as the particular lens configuration in imaging lens 20.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A computer, comprising:

a central processing unit in a housing;

a keyboard spaced from said housing and electrically coupled to said central processing unit; and a video projection mechanism in said keyboard and electrically coupled to said processing means for projecting a variable image onto a surface spaced a distance from said keyboard.

2. The computer of claim 1, wherein said video projection mechanism comprises a digital light processing system.

3. The computer of claim 2, wherein said digital light processing system includes:

a light source providing incident light;

a semiconductor light switch having a plurality of mirrors for receiving and reflecting said light; and an imaging lens for projecting said light reflecting off said mirrors onto said surface, thereby displaying said video image.

4. The computer of claim 3, wherein said semiconductor light switch is coupled to a signal processor.

5. The computer of claim 4, wherein said semiconductor is coupled to a signal processor and a digital control unit.

6. The computer of claim 3, wherein said imaging lens is associated with said top surface of said housing.

7. The computer of claim 1, wherein said video projection mechanism includes an imaging lens through which images are projection onto a viewing surface.

8. The computer of claim 7, wherein said imaging lens is mounted on a top surface of said keyboard.

9. The computer of claim 7, wherein said imaging lens is mounted on an upper surface of said keyboard.

10. The computer of claim 7, wherein said imaging lens is manually adjustable.

11. The computer of claim 7, wherein said imaging lens includes an auto-focus mechanism.

12. The computer of claim 7, wherein said imaging lens is manually adjustable.

13. The computer of claim 7, wherein said imaging lens includes an auto-focus mechanism.

14. An apparatus, comprising:

a central processing unit in a housing;

a keyboard spaced from said housing and electrically coupled to said central processing unit; and a video projection mechanism in said keyboard and electrically coupled to said processing means for projecting a variable image onto a surface spaced a distance from said keyboard.

15. The apparatus of claim 14, wherein said apparatus is a computer.

* * * * *